(12) United States Patent
Nilsson

(10) Patent No.: US 6,907,259 B1
(45) Date of Patent: Jun. 14, 2005

(54) RADIO TRANSCEIVER

(75) Inventor: Johan Nilsson, Höllviken (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 438 days.

(21) Appl. No.: 09/684,985

(22) Filed: Oct. 10, 2000

(30) Foreign Application Priority Data

Oct. 11, 1999 (GB) .............................................. 9924033

(51) Int. Cl.$^7$ .............................................. H04Q 4/20
(52) U.S. Cl. .................................... 455/522; 455/441
(58) Field of Search ........................ 455/522, 432–441, 455/457, 406, 428, 430, 226.1, 238.1, 297, 296, 395, 345, 344, 443, 444, 504, 517, 423, 245.1; 370/335, 342, 331, 465, 332, 333

(56) References Cited

U.S. PATENT DOCUMENTS

| | | | | |
|---|---|---|---|---|
| 5,548,806 A | * | 8/1996 | Yamaguchi et al. | 455/441 |
| 5,778,030 A | * | 7/1998 | Bruckert et al. | 375/317 |
| 5,963,870 A | | 10/1999 | Chheda et al. | |
| 5,983,104 A | * | 11/1999 | Wickman et al. | 455/441 |
| 6,052,598 A | * | 4/2000 | Rudrapatna et al. | 455/456.1 |
| 6,208,861 B1 | * | 3/2001 | Suzuki | 455/441 |
| 6,256,500 B1 | * | 7/2001 | Yamashita | 455/441 |
| 6,337,989 B1 | * | 1/2002 | Agin | 455/522 |
| 6,377,813 B1 | * | 4/2002 | Kansakoski et al. | 455/522 |
| 6,385,460 B1 | * | 5/2002 | Wan | 455/515 |
| 6,490,460 B1 | * | 12/2002 | Soliman | 455/522 |
| 6,515,975 B1 | * | 2/2003 | Chheda et al. | 370/332 |
| 6,549,785 B1 | * | 4/2003 | Agin | 455/522 |
| 6,564,042 B1 | * | 5/2003 | Jou et al. | 455/238.1 |

FOREIGN PATENT DOCUMENTS

| | | |
|---|---|---|
| EP | 0847146 | 8/2000 |
| WO | WO9631014 | 10/1996 |
| WO | WO9734372 | 9/1997 |
| WO | WO0055985 | 9/2000 |

OTHER PUBLICATIONS

Seo et al., "SIR–Based Transmit Power Control of Reverse Link for Coherant DS–CDMA Mobile Radio", *IEICE Trans. Commun.*, vol. E81–B, No. 7, Jul. 1998, pp 1508–1516.
International Search Report (Application No. GB 9924033.5).
International Search Report (Application No. PCT/EP 00/09663.

* cited by examiner

*Primary Examiner*—Pablo N. Tran
(74) *Attorney, Agent, or Firm*—Potomac Patent Group PLLC

(57) ABSTRACT

A radio transceiver, for example a mobile station, for use in a code division multiple access (CDMA) system, estimates the signal-to-interference ratio of received signals, for use in power control of transmissions thereto. The estimation algorithm, used to estimate the signal-to-interference ratio, is altered based on the estimated relative velocity of the transceiver.

10 Claims, 1 Drawing Sheet

RADIO TRANSCEIVER

TECHNICAL FIELD

This invention relates to radio transceivers, and more particularly to methods of controlling the power at which such transceivers transmit.

BACKGROUND OF THE INVENTION

In a radio communication system, such as a radio telecommunications system having base stations and large numbers of mobile stations which may be in communication with each base station, it is necessary to control the power with which signals are transmitted. For example, it is advantageous to reduce transmit power as far as practicable, but the transmit power must be high enough to provide a required signal level at the receiver. In the case of a direct sequence code division multiple access (DS-CDMA) system, the signals transmitted from the different mobile stations should preferably all be received at the base station at the same level.

Power control is performed by measuring the signal-to-interference ratio (SIR), and controlling the transmit power so that this reaches a target value.

For example, U.S. Pat. No. 5,773,030 describes a spread spectrum communication system, in which a base station sends an adjustment signal to a mobile station, to control the power of transmissions from the mobile station. The adjustment signal is calculated to increase the power level if the received power level is below a threshold, and to decrease the transmit power level if the received power level is above a threshold. The threshold is set at a value which depends on the measured speed of the mobile station.

The paper "SIR-Based Transmit Power Control of Reverse Link for Coherent DS-CDMA Mobile Radio", by Seo, et al, IEICE Trans. Commun. Vol.E81-B, No. 7 July 1998 pp1508–1516, describes an alternative system. In that system, the transmit power of a mobile station is controlled in response to a TPC (transmit power control) signal sent from a base station. The TPC is calculated on the basis of a comparison performed in the base station between, on the one hand, an estimate of the signal-to-interference (SIR) ratio of signals received from the mobile station at the base station and, on the other hand, a target signal-to-interference value. The speed of movement of the mobile station is mentioned as a parameter which has an effect on the optimum size of the steps in which the TPC signal can be controlled.

SUMMARY OF THE INVENTION

A feature of a mobile radio communication system is fading, that is, the variation with time of the quality of a radio channel.

The present invention proceeds from a recognition that, when a mobile station is moving slowly, it is advantageous to control the transmit power thereof to follow, and compensate for, fading of the channel. However, when a mobile station is moving quickly, it will generally not be possible to control the transmit power sufficiently quickly to compensate for a fast fading channel.

According to the present invention, there are provided a radio transceiver, and a method of control thereof, in which a quality measure of received signals, for example the signal-to-interference ratio, is estimated using an algorithm which depends on the measured or estimated velocity of a mobile station.

DETAILED DESCRIPTION OF PREFERRED EMBODIMENTS

Figure 1:
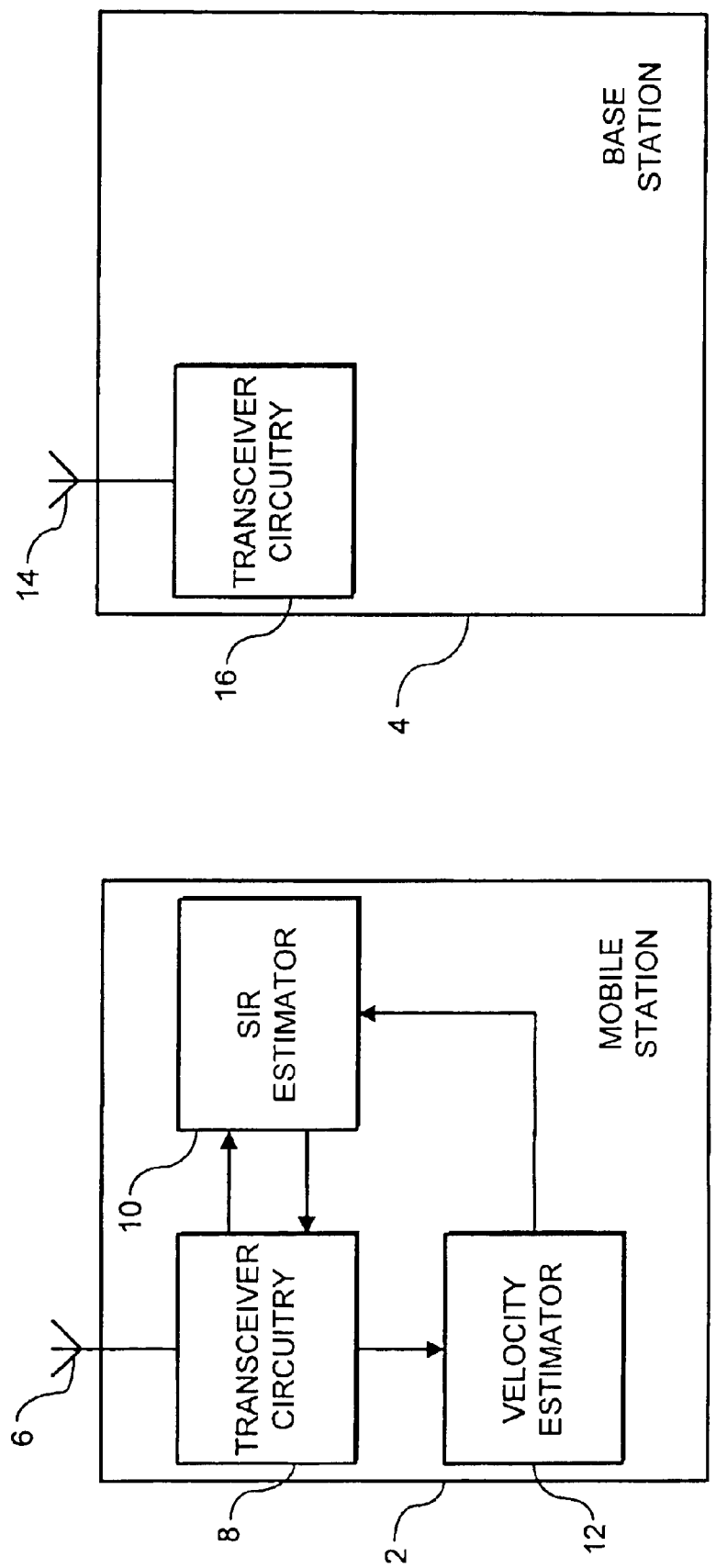
FIG. 1 is a block schematic diagram of a transceiver according to the present invention.

FIG. 1 shows a transceiver according to one aspect of the present invention, in the form of a mobile station 2, which is in communication with a base station 4. For example, the mobile station may communicate with the base station using a wideband code division multiple access (W-CDMA) system.

As shown in FIG. 1, the mobile station 2 includes an antenna 6, and transceiver circuitry 8, which are conventional and well known to the person skilled in the art, and will not be described further herein.

The mobile station 2 also includes a signal-to-interference ratio (SIR) estimator 10, and a velocity estimator 12.

The base station 4 includes an antenna 14, and transceiver circuit 16, which are generally conventional and well known to the person skilled in the art, and will not generally be described further herein.

The SIR estimator 10 of the mobile station 4 is used to control the quality of a signal received from the base station 4. In general terms, if a signal is received at too low a power level, data will be lost. However, it is disadvantageous for transmissions to be made at power levels which are higher than necessary, as this is a potential source of interference.

Thus, as is generally known, the SIR estimator 10 receives pilot symbols and data symbols from the transceiver circuitry 9, and uses them to estimate the signal power and interference power. According to the present invention, however, the SIR estimator 10 uses an estimation algorithm which has a velocity estimate as an input thereto.

Thus, the velocity estimation circuit 12 estimates the velocity of the mobile station 2, for example estimating its velocity relative to the fixed base station 4 by observing the spreading of the received signals in the frequency domain, as a result of the Doppler effect. More details of one technique for velocity estimation are given for example in U.S. Pat. No. 5,778,030 discussed above. The estimated value of the velocity is then supplied to the SIR estimator 10, and used as an input to the algorithm used therein.

For example, when the mobile station is moving at a low velocity, it becomes possible to follow fast fading of the radio channel. Therefore, it is advantageous to use a fast SIR estimation algorithm. When the mobile station is moving at a high velocity, it is no longer possible to follow fading of the radio channel. Therefore, it is preferable to control a mean value of the signal-to-interference ratio, and so it is advantageous to use a slow SIR estimation algorithm.

For example, the speed of the algorithm, and bandwidth of the estimator, affect the noise properties of the estimate.

SIR estimation algorithms are known to the person skilled in the art, and any suitable algorithms can be chosen in accordance with the invention. For example, the SIR estimator may be able to use both a fast estimation algorithm and a slow estimation algorithm, and may switch between them depending on whether the estimated velocity of the mobile station is below or above a threshold velocity. Alternatively, the SIR estimator may implement an estimation algorithm which uses the estimated velocity of the mobile station as a parameter therein, again to have the effect that, when the mobile station is moving at a low velocity, the SIR estimation algorithm is relatively fast, and, when the mobile station is moving at a high velocity, the SIR estimation algorithm is relatively slow. A suitable algorithm can be defined by the person skilled in the art.

As mentioned above, the estimated value of the signal-to-interference ratio is compared with a threshold value. The signal-to-interference ratio threshold value is itself set by a control loop which attempts to achieve a desired value of a quality measure of the received signal. For example, the target quality measure could be the bit error rate or frame error rate.

Based on the comparison of the signal-to-interference ratio with the threshold value, a power control signal is sent from the mobile station to the base station 14, and acted upon in the transceiver circuitry 16 of the base station. If the signal-to-interference ratio is lower than the threshold value, a power control signal is sent to increase the transmit power of the base station, and, if the signal-to-interference ratio is higher than the threshold value, a power control signal is sent to decrease the transmit power of the base station.

The invention has been described above in relation to a system in which a mobile station estimates the signal-to-interference ratio of signals received thereby, and then sends a signal to a base station to control the power of transmissions therefrom. It will be appreciated that the invention can be applied also to a system in which a base station estimates the signal-to-interference ratio of signals received from a mobile station using a similar method for estimating the velocity of the mobile station relative to the base station, and then sends a signal to the mobile station to control the power of its transmissions.

The invention has been specifically described with reference to its use in a CDMA system. However, it will be apparent that the invention can also be used for signal-to-interference ratio estimation, and therefore also for power control if desired, in time division multiple access (TDMA) systems.

There is therefore described a transceiver which allows better control of the transmission powers in a mobile communications system, by adapting the signal quality estimation algorithm to the velocity of movement of the transmitting or receiving mobile station.

What is claimed is:

1. A radio transceiver, comprising:
    a receiver, for receiving radio signals;
    a quality estimator, for estimating a first measure of quality of received radio signals, the quality estimator using an estimation algorithm having a response speed; and
    a speed estimator, for obtaining a measure of relative velocity of the transceiver, wherein:
    the measure of relative velocity is used as an input to the quality estimator, and the response speed of the estimation algorithm is controlled in response to measure of velocity of the transceiver; and
    the radio transceiver further comprises:
        a comparison circuit, for comparing the estimated first measure of quality with a threshold value thereof; and
        a control circuit, for transmitting a power control signal to a further transceiver, based on the result of said comparison.

2. A radio transceiver as claimed in claim 1, wherein the estimated first measure of quality is the signal-to-interference ratio.

3. A radio transceiver as claimed in claim 1, wherein the estimated first measure of quality threshold value is set to achieve a target value of a second measure of quality.

4. A radio transceiver as claimed in claim 3, wherein the second measure of quality is a bit error rate.

5. A radio transceiver as claimed in claim 3, wherein the second measure of quality is a frame error rate.

6. A radio transceiver as claimed in claim 1, wherein the response speed of the estimation algorithm is controlled such that a first higher response speed is used in the event of a low measure of velocity of the transceiver, and a second lower response speed is used in the event of a high measure of velocity of the transceiver.

7. A mobile station, including a radio transceiver as claimed in claim 1.

8. A base station, including a radio transceiver as claimed in claim 1.

9. A method of estimating quality of received radio signals in a transceiver, comprising:
    obtaining a measure of relative velocity of the transceiver; and
    estimating the quality using an estimation algorithm, including using the measure of relative velocity as an input to the estimation algorithm, wherein the quality estimation algorithm has a response speed, and the response speed of the estimation algorithm is controlled in response to the measure of relative velocity of the transceiver, wherein the response speed of the estimation algorithm is controlled such that a first higher response speed is used in the event of a low measure of velocity of the transceiver, and a second lower response speed is used in the event of a high measure of velocity of the transceiver.

10. A method as claimed in claim 9, wherein the estimated measure of quality is the signal-to-interference ratio.

* * * * *

UNITED STATES PATENT AND TRADEMARK OFFICE
CERTIFICATE OF CORRECTION

PATENT NO.     : 6,907,259 B1  
DATED          : June 14, 2005  
INVENTOR(S)    : Johan Nilsson It is certified that error appears in the above-identified patent and that said Letters Patent is hereby corrected as shown below:

Column 2,
Line 32, change "circuitry 9" to -- circuitry 8 --.

Signed and Sealed this

Eleventh Day of April, 2006

JON W. DUDAS
*Director of the United States Patent and Trademark Office*